United States Patent [19]
Wong

[11] Patent Number: 5,856,936
[45] Date of Patent: *Jan. 5, 1999

[54] CALCULATING A - SIGN(A) IN A SINGLE INSTRUCTION CYCLE

[75] Inventor: Roney S. Wong, Sunnyvale, Calif.

[73] Assignee: Samsung Semiconductor, Inc., San Jose, Calif.

[*] Notice: The term of this patent shall not extend beyond the expiration date of Pat. No. 5,835,394.

[21] Appl. No.: 719,185

[22] Filed: Sep. 24, 1996

[51] Int. Cl.$^6$ .................................................. G06F 7/50
[52] U.S. Cl. ...................................... 364/768; 364/784.01
[58] Field of Search .................................... 364/768, 770, 364/746.2, 715.012, 715.011, 715.02, 784.01; 395/562

[56] References Cited

U.S. PATENT DOCUMENTS

| | | | |
|---|---|---|---|
| 4,218,751 | 8/1980 | McManigal | 364/715.012 |
| 4,709,226 | 11/1987 | Christopher | 341/93 |
| 4,953,115 | 8/1990 | Kanoh | 364/715.012 |
| 5,267,187 | 11/1993 | Hsieh et al. | 364/784.01 |
| 5,373,459 | 12/1994 | Taniguchi | 364/715.012 |
| 5,574,671 | 11/1996 | Young et al. | 364/715.03 |
| 5,798,958 | 8/1998 | Wong | 364/768 |

*Primary Examiner*—Reba I. Elmore
*Assistant Examiner*—Robert J. Dolan
*Attorney, Agent, or Firm*—Skjerven, Morrill, MacPherson, Franklin & Friel LLP

[57] ABSTRACT

The expression A−sign(A), where A is a signed binary integer represented in 2's complement form, sign (A) is equal to one when A is greater than zero, sign (A) is equal to zero when A is zero, and sign (A) is equal to negative one when A is less than zero, is calculated by bit-complementing A, bit-complementing ($\bar{A}$−1) when A is less than zero, bit-complementing $\bar{A}$ when A is equal to zero, and bit-complementing ($\bar{A}$+1) when A is greater than zero. Zero detect for A is provided by determining whether a first carry-out bit from ($\bar{A}$+0) and a second carry-out bit from ($\bar{A}$+1) have different logical values. In this manner, A−sign (A) can be calculated by a general purpose computer in a single instruction cycle.

11 Claims, 6 Drawing Sheets

CALCULATING A - SIGN(A) IN A SINGLE INSTRUCTION CYCLE

BACKGROUND OF THE INVENTION

1. Field of the Invention

The present invention relates to computer arithmetic, and more particularly to calculating the expression A−sign (A) for signed binary integers.

2. Description of Related Art

The Moving Picture Experts Group (MPEG) standard has emerged as the dominant standard for compressed digital video. The MPEG-1 standard specifies a compressed video bit-stream rate of approximately 1.5 megabits per second, and a compressed stereo audio bit-stream rate of approximately 250 kilobits per second. The second standard, MPEG-2, will specify compression rates for higher-bandwidth distribution media, and is in the process of being formalized. To meet the MPEG standard, video and audio compression and decompression products must rapidly process the various algorithms used to implement the MPEG standard.

In MPEG video signal processing, the basic video information processing unit is typically a macro-block, which has a 16×16 pixel matrix comprising four 8×8 luminance blocks, and two 8×8 chrorninance blocks. Each pixel in a luminance block or chrominance block has an output corresponding to an unsigned integer number, and each macro-block is part of a much larger luminance or chrominance frame, as the case may be.

MPEG video signal processing includes a computation requirement for calculating A−sign (A) for each pixel in a block, where A is a signed binary integer, sign (A) is equal to one when A is greater than zero, sign (A) is equal to zero when A is zero, and sign (A) is equal to negative one when A is less than zero.

FIG. 1 is a flow chart of algorithm 100, which is known, for calculating A−sign (A). At step 102, signed binary operand A is obtained. Decision step 104 tests whether A is zero. If A is zero, the algorithm branches to end step 112 since A provides A−sign (A). If A is nonzero, the algorithm branches to decision step 106 which tests whether A is negative. If A is negative, at step 108 A is incremented to obtain A+1, and the algorithm terminates at end step 112 since A+1 provides A−sign (A). Returning to decision step 106, if A is nonnegative (and therefore greater than zero since A is nonzero) then at step 110 A is decremented to obtain A−1, and the algorithm terminates at end step 112 since A−1 provides A−sign (A). Conventional variations to algorithm 100 are apparent. For instance, A can be tested for being negative before A is tested for being zero. Although algorithm 100 and related variations are simple to implement, they normally require several instruction cycles.

Moreover, providing zero detect at decision step 104 may require a large amount of chip area or several instruction cycles using conventional approaches. For instance, zero detect of an n-bit operand can be provided by an n-bit OR gate coupled to an inverter. The OR gate outputs a zero, which the inverter converts to a one, only when the operand consists of zero's. Drawbacks to this approach include the increased fan-in of the OR gate, which increases chip area, and the delay associated with ORing each bit of the operand. Another known technique for zero detect of a binary operand includes serially right-shifting the operand, and inspecting the shifted-out bits one at a time. As soon as a shifted-out bit of one is detected then the operand must be nonzero, whereas if all shifted-out bits are zero's then the operand must be zero. A drawback to this approach is that the right-shifting operation can be relatively time consuming and particularly difficult to implement in a single instruction cycle.

Accordingly, a need exists for calculating A−sign (A) in a rapid and efficient manner.

SUMMARY OF THE INVENTION

An object of the invention is to provide rapid and efficient calculation of A−sign (A). In accordance with a preferred aspect of the invention, A−sign (A) is calculated by a general purpose computer in a single instruction cycle.

The present invention includes a method of operating a circuit to calculate A−sign (A). One embodiment of the method includes bit-complementing A to obtain $\overline{A}$, bit-complementing ($\overline{A}$−1) to obtain A−sign (A) when A is less than zero, bit-complementing $\overline{A}$ to obtain A−sign (A) when A is equal to zero, and bit-complementing ($\overline{A}$+1) to obtain A−sign (A) when A is greater than zero. Preferably, the method includes setting a constant C to negative one and selecting a sum output of ($\overline{A}$−1) when A is less than zero, setting the constant C to zero and selecting a sum output of $\overline{A}$ when A is zero, and setting the constant C to zero and selecting a sum-plus-one output of ($\overline{A}$+1) when A is greater than zero. Setting the constant C is in response to a sign bit of A, indicative of whether A is positive or negative, and the selecting is in response to the sign bit of A and a zero detect flag, indicative of whether A is zero or nonzero. Furthermore, zero detect of A can be provided by determining whether a first carry-out bit from ($\overline{A}$+0) and a second carry-out bit from ($\overline{A}$+1) have different logical values.

The present invention also includes an apparatus for calculating A−sign (A). In one embodiment, the apparatus includes first and second inverter circuits, a data selector circuit, an adder circuit, and a multiplexer in combination. The first inverter circuit provides the bit-complement of A to a first operand input of the adder circuit. The data selector circuit sets a constant C to negative one when A is less than zero and to zero when A is greater than or equal to zero, and provides the constant C to a second operand input of the adder circuit. The adder circuit calculates ($\overline{A}$−1) at a sum output when A is less than zero, ($\overline{A}$+0) at the sum output when A is equal to zero, and ($\overline{A}$+1) at a sum-plus-one output when A is greater than zero. The multiplexer selects the sum output when A is less than or equal to zero, and selects the sum-plus-one output when A is greater than zero. Finally, the second inverter circuit provides the bit-complement of the multiplexer output. Preferably, the adder circuit generates a first carry-out bit from the sum output and a second carry-out bit from the sum-plus-one output, and a zero detect circuit determines whether A is zero by determining whether the first and second carry-out bits have different logical values.

These and other objects, features and advantages of the invention will be further described and more readily apparent from a review of the detailed description of the preferred embodiments which follow.

BRIEF DESCRIPTION OF THE DRAWINGS

In the drawings, which are not necessarily drawn to scale, in which like reference characters indicate like parts.

DETAILED DESCRIPTION OF THE PREFERRED EMBODIMENTS

Figure 1:
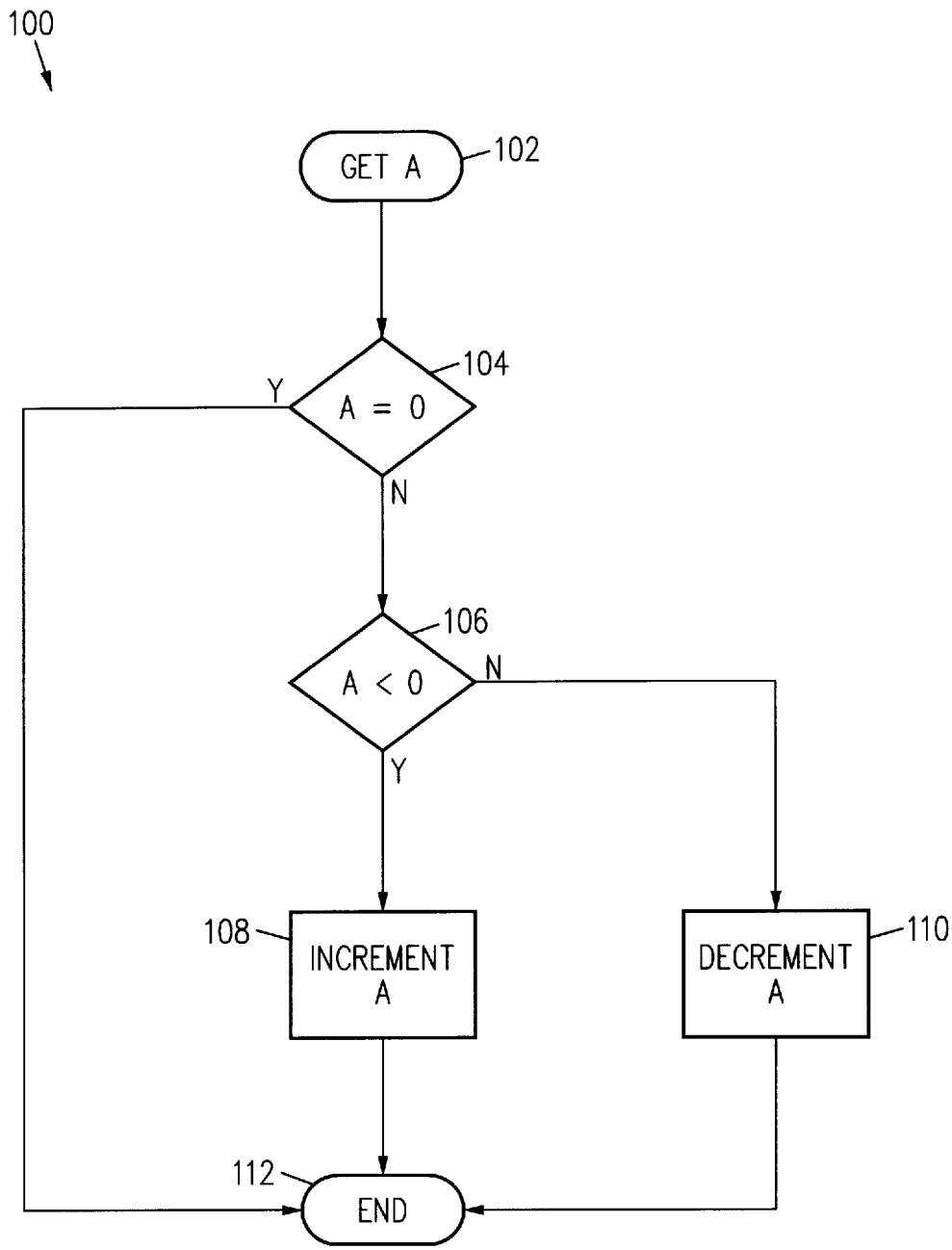
FIG. 1 is a flow chart of a known algorithm for calculating A−sign (A).

The present invention calculates A–sign (A) in a single instruction cycle by bit-complementing A to obtain $\overline{A}$, bit-complementing $(\overline{A}-1)$ to obtain A–sign (A) when A is less than zero, bit-complementing $\overline{A}$ to obtain A–sign (A) when A is equal to zero, and bit-complementing $(\overline{A}+1)$ to obtain A–sign (A) when A is greater than zero.

As used herein, A is a signed binary integer represented in 2's complement form. As mentioned above, sign (A) is equal to one when A is greater than zero, sign (A) is equal to zero when A is zero, and sign (A) is equal to negative one when A is less than zero. Determining whether A is positive (including zero) or negative is accomplished by inspection of its most significant bit ("MSB"). For a positive A the MSB=0, whereas for a negative A the MSB=1. Bit-complementing is equivalent to a 1's complement operation. For instance, $\overline{A}$ designates the bit-complement of A. Finally, incrementing refers to increasing by one.

The present invention is perhaps best understood by considering some of the underlying mathematics. In 2's complement representation, the negative of an integer number is provided by taking the 1's complement of the number and then incrementing, that is, $$-A = \bar{A}+1 \qquad (1)$$

$$\overline{A} = -A-1 \qquad (2)$$

Consider the following algebraic manipulations for A–sign (A) when A is less than zero:

$$A\text{-sign }(A)=A-(-1) \qquad (3)$$

$$A\text{-sign }(A)=A+2-1 \qquad (4)$$

$$A\text{-sign }(A)=-(-A-2)-1 \qquad (5)$$

$$A\text{-sign }(A)=\overline{-A-2} \qquad (6)$$

$$A\text{-sign }(A)=\overline{(-A-1)-1} \qquad (7)$$

$$A\text{-sign }(A)=\overline{\overline{A}-1} \qquad (8)$$

Consider the following algebraic manipulations for A–sign (A) when A is equal to zero:

$$A\text{-sign }(A)=A-(0) \qquad (9)$$

$$A\text{-sign }(A)=A \qquad (10)$$

$$A\text{-sign }(A)=\overline{\bar{A}} \qquad (11)$$

Consider the following algebraic manipulations for A–sign (A) when A is greater than zero:

$$A\text{-sign }(A)=A-(1) \qquad (12)$$

$$A\text{-sign }(A)=A-1 \qquad (13)$$

$$A\text{-sign }(A)=-(-A)-1 \qquad (14)$$

$$A\text{-sign }(A)=\overline{-A} \qquad (15)$$

$$A\text{-sign }(A)=\overline{(-A-1)+1} \qquad (16)$$

$$A\text{-sign }(A)=\overline{\overline{A}+1} \qquad (17)$$

In accordance with expression (8), when A is less than zero, A–sign (A) is provided by bit-complementing ($\overline{A}-1$). In accordance with expression (11), when A is equal to zero, A–sign (A) is provided by bit-complementing $\overline{A}$. In accordance with expression (17), when A is greater than zero, A–sign (A) is provided by bit-complementing ($\overline{A}+1$).

Figure 2:
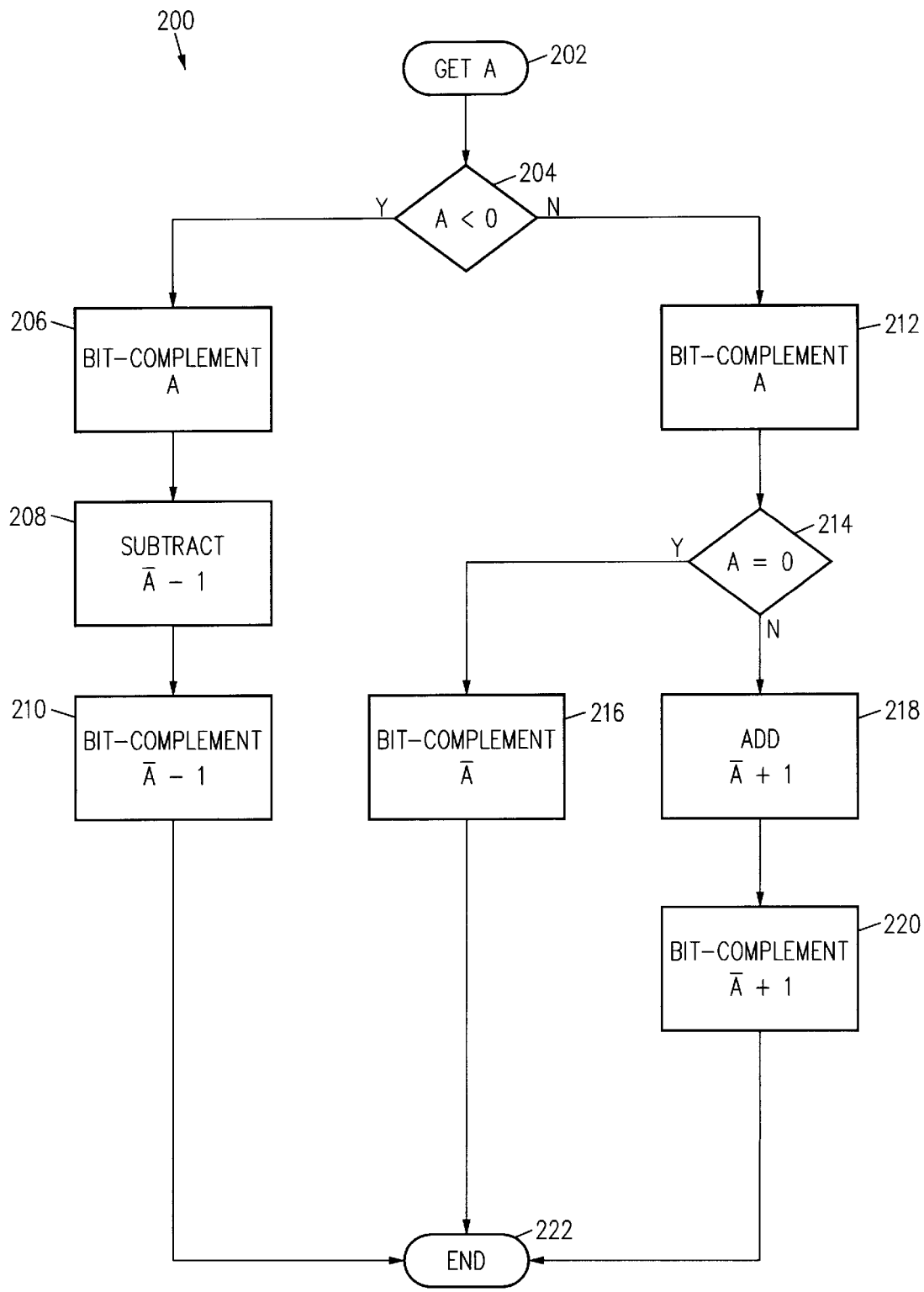
FIG. 2 is a flow chart of an algorithm for calculating A−sign (A) in accordance with an embodimentof the present invention.

FIG. 2 is a flow chart of algorithm 200 for calculating A–sign (A) in accordance with an embodiment of the invention. At step 202, signed binary operand A is obtained. Decision step 204 tests whether A is negative. If A is negative, at step 206 A is bit-complemented, at step 208 the difference $\overline{A}-1$ is calculated, at step 210 the difference $\overline{A}-1$ is bit-complemented to provide the result, and the algorithm terminates at end step 222. Returning to decision step 204, if A is nonnegative, at step 212 A is bit-complemented, and decision step 214 tests whether A is zero. If A is zero, at step 216 $\overline{A}$ is bit-complemented to provide the result, and the algorithm terminates at end step 222. Returning to decision step 214, if A is nonzero (and therefore greater than zero since A is also nonnegative) then at step 218 the sum $\overline{A}+1$ is calculated, at step 220 the sum $\overline{A}+1$ is bit-complemented to provide the result, and the algorithm terminates at end step 222.

Variations to algorithm 200 are apparent. For instance, A can be bit-complemented before the sign bit (or complemented sign bit) of A is inspected. For each value of A, the expressions $\overline{A}-1$, $\overline{A}$ and $\overline{A}+1$ can be calculated (concurrently if desired) with the appropriate expression selected depending on whether A is less than, equal to, or greater than zero, respectively. Likewise, A can be tested for being less than, equal to, or greater than zero before the appropriate expression is calculated.

Zero detect of A can be accomplished by bit-complementing A, and inspecting a carry-out bit from the MSB position generated by incrementing the bit-complement of A. The carry-out bit is a one only if the bit-complement of A is a string of one's, otherwise the carry-out bit is a zero. Furthermore, the bit-complement of A is a string of one's only if A is a string of zero's. Therefore, the carry-outbit generated by incrementing the bit-complement of A is a one only if A is zero. In a similar manner, zero detect of A can be accomplished by decrementing A, and inspecting a carry-out bit generated by incrementing A–1.

Zero detect of A can also be accomplished by generating a first carry-out bit from the MSB position of the sum $\overline{A}+0$, generating a second carry-out bit from the MSB position of the sum $\overline{A}+1$, and determining whether the first and second carry-out bits have different logical values. When A is zero, the first sum is a string of one's, the second sum is a string of zero's, and the first and second carry-out bits will have different logical values. Likewise, when A is nonzero, the first and second carry-out bits will have identical logical values. Advantageously, the first and second carry-out bits can be generated concurrently to provide rapid zero detect. Furthermore, the first and second carry-out bits can be generated without (or before) actually summing the numbers, for instance by use of PG generator sections and carry chains.

Thus, if A is an n-bit string of zero's, $\overline{A}+0$ is an n-bit string of one's that generates a first carry-out bit of zero from the MSB position, and $\overline{A}+1$ is an n-bit string of zero's that generates a second carry-out bit of one from the MSB position. Accordingly, the first and second carry-out bits have different logical values since A is zero. Remarkably, the sums $\overline{A}+0$ and $\overline{A}+1$ can be used for both calculating A−sign (A) and determining whether A is zero.

Further details regarding zero detect are set forth in U.S. application Ser. No. 08/658,454, filed Jun. 5, 1996, entitled "Zero Detect For Binary Sum" by R. Wong, which is incorporated herein by reference.

With regards to overflow, if A is an n-bit number, and A−sign(A) is an n-bit result, then overflow does not occur. That is, A−sign (A) never increases the absolute value of A.

Various examples of calculating A−sign (A), in accordance with algorithm 200, where A is less than zero, are listed below in Table 1. For illustration purposes, A is a 4-bit operand, and A−sign (A) is a 4-bit result.

TABLE 1

CALCULATING A - SIGN(A) WHERE A IS LESS THAN ZERO

| Operand A (decimal) | $\overline{A}$ | $\overline{A} - 1$ ($\overline{A} + (-1)$) | $\overline{A} - 1$ [A − sign(A)] |
|---|---|---|---|
| 1000 (decimal −8) | 1000 ↓ | 0111 + 1111 | 0110 ↓ |
|  | 0111 | 1 0110 | 1001 (decimal −7) |
| 1010 (decimal −6) | 1010 ↓ | 0101 + 1111 | 0100 ↓ |
|  | 0101 | 1 0100 | 1011 (decimal −5) |
| 1101 (decimal −3) | 1101 ↓ | 0010 + 1111 | 0001 ↓ |
|  | 0010 | 1 0001 | 1110 (decimal −2) |
| 1111 (decimal −1) | 1111 ↓ | 0000 + 1111 | 1111 ↓ |
|  | 0000 | 0 1111 | 0000 (decimal 0) |

A single example of calculating A−sign (A), in accordance with algorithm 200, where A is equal to zero, is listed below in Table 2. For illustration purposes, A is a 4-bit operand, and A−sign (A) is a 4-bit result.

TABLE 2

CALCULATING A - SIGN(A) WHERE A IS EQUAL TO ZERO

| Operand A (decimal) | $\overline{A}$ | $\overline{\overline{A}}$ [A − sign(A)] |
|---|---|---|
| 0000 (decimal 0) | 0000 ↓ 1111 | 1111 ↓ 0000 (decimal 0) |

Various examples of calculating A−sign (A) in accordance with algorithm 200, where A is greater than zero, are listed below in Table 3. For illustration purposes, A is a 4-bit operand, and A−sign (A) is a 4-bit result.

TABLE 3

CALCULATING A - SIGN(A) WHERE A IS GREATER THAN ZERO

| Operand A (decimal) | $\overline{A}$ | $\overline{A} + 1$ | $\overline{\overline{A} - 1}$ [A − sign(A)] |
|---|---|---|---|
| 0111 (decimal 7) | 0111 ↓ | 1000 + 0001 | 1001 ↓ |
|  | 1000 | 0 1001 | 0110 (decimal 6) |
| 0110 (decimal 6) | 0110 ↓ | 1001 + 0001 | 1010 ↓ |
|  | 1001 | 0 1010 | 0101 (decimal 5) |
| 0011 (decimal 3) | 0011 ↓ | 1100 + 0001 | 1101 ↓ |
|  | 1100 | 0 1101 | 0010 (decimal 2) |
| 0001 (decimal 1) | 0001 ↓ | 1110 + 0001 | 1111 ↓ |
|  | 1110 | 0 1111 | 0000 (decimal 0) |

Figure 3:
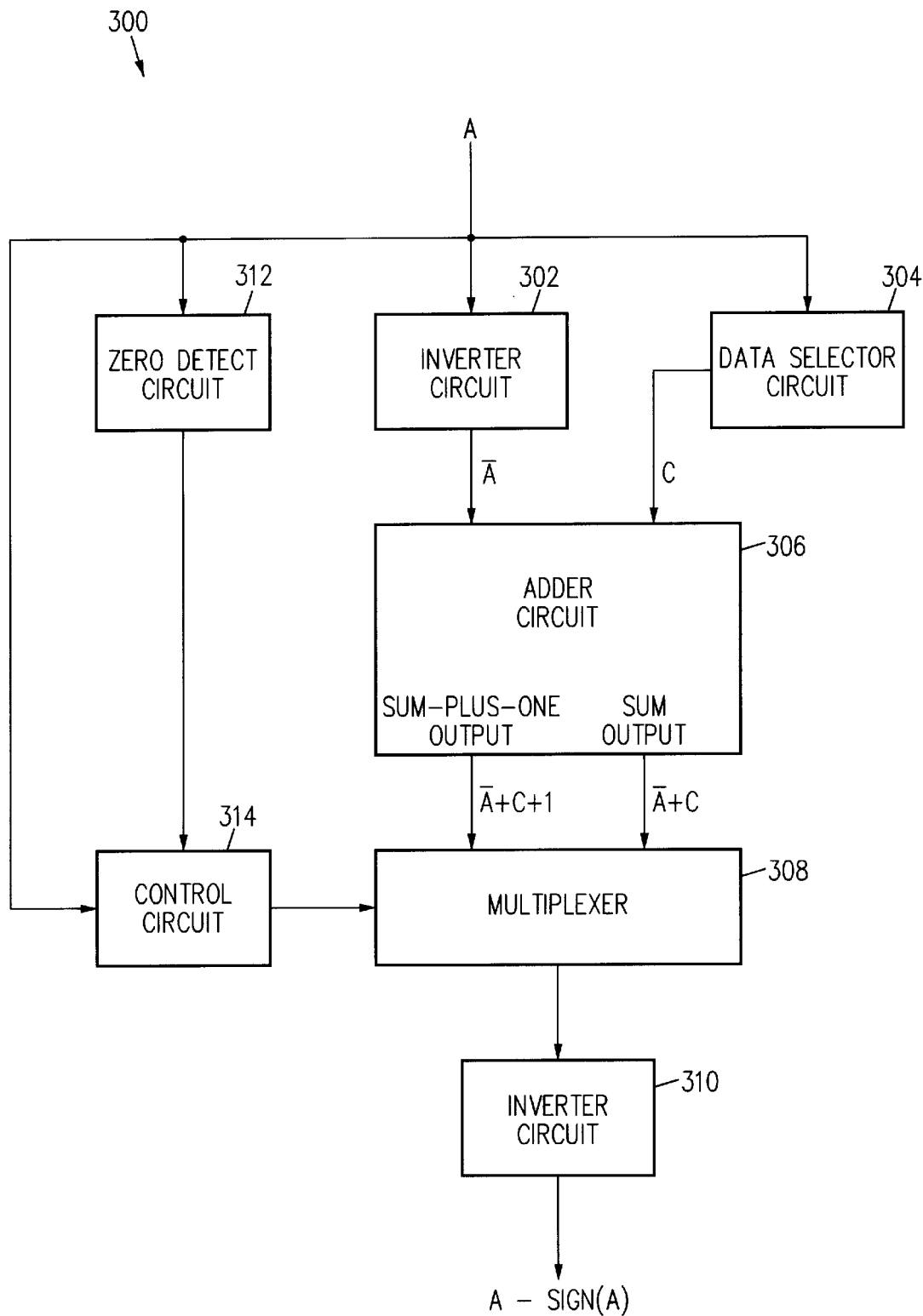
FIG. 3 is a block diagram of a logic circuit for calculating A–sign (A) in accordance with an embodiment of the present invention.

FIG. 3 is a block diagram of a logic circuit 300 for calculating A−sign (A) in accordance with an embodiment of the present invention. Inverter circuit 302 includes an operand input coupled to A and generates $\overline{A}$ at an output. Data selector circuit 304 includes an input coupled to the sign bit of A, and generates a constant C at its output set to zero when A is greater than or equal to zero, and set to negative one when A is less than zero. Adder circuit 306 includes a first operand input for receiving $\overline{A}$ and a second operand input for receiving the constant C. Adder circuit 306 generates $\overline{A}+C$ at a sum output, and $\overline{A}+C+1$ at a sum-plus-one output. Thus, the sum output provides $\overline{A}-1$ when A is less than zero, and $\overline{A}$ when A is greater than or equal to zero. Likewise, the sum-plus-one output provides $\overline{A}$ when A is less than zero, and $\overline{A}+1$ when A is greater than or equal to zero. Multiplexer 308 receives the sum output and sum-plus-one output at first and second operand inputs, and selects one or the other in response to a control input. Inverter circuit 310 includes an operand input coupled to the output of multiplexer 308, and outputs the bit-complement of the output of multiplexer 308. Zero detect circuit 312 determines whether A is zero or nonzero, and control circuit 314 controls multiplexer 308 in response to zero detect circuit 312 and the sign bit of A. Control circuit 314 causes multiplexer 308 to select the sum output when the sign bit of A indicates A is negative or zero detect circuit 312 indicates A is zero, and otherwise causes multiplexer 308 to select the sum-plus-one output when the sign bit of A indicates A is nonnegative and zero detect circuit 312 indicates A is nonzero (thereby indicating A is greater than zero). In this manner, inverter circuit 310 outputs $\overline{\overline{A}-1}$ when A is less than zero, $\overline{\overline{A}}$ when A is equal to zero, and $\overline{\overline{A}+1}$ when A is greater than zero.

Alternatively, if desired, zero detect circuit 312 can be modified to inspect carry-out bits from MSB positions of the sum and sum-plus-one outputs of adder circuit 306, instead of inspecting A directly.

Figure 4:
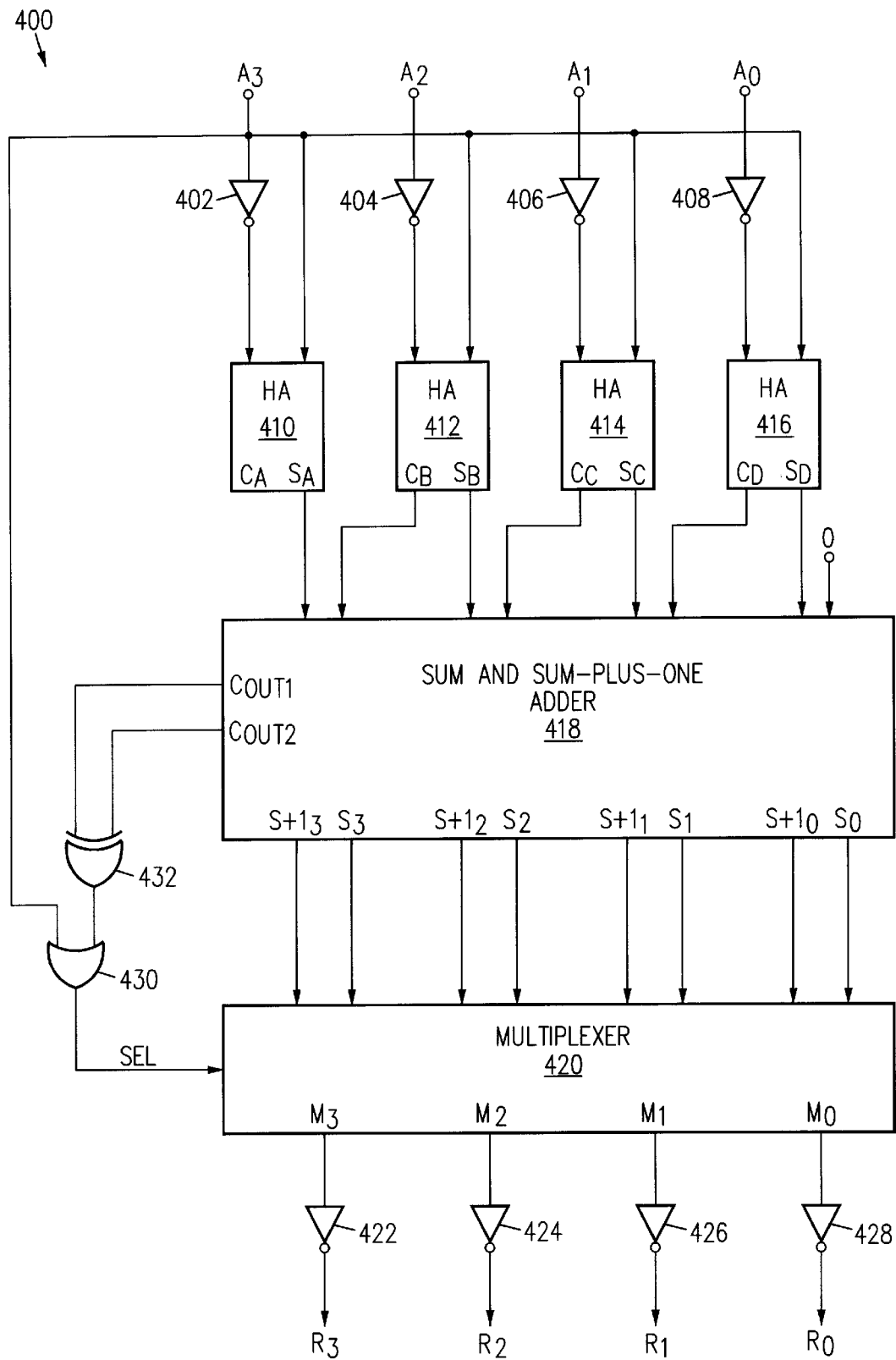
FIG. 4 is a block diagram of a logic circuit for calculating A–sign (A) in accordance with another embodiment of the present invention.

FIG. 4 is a block diagram of a logic circuit 400 for calculating A−sign (A) in accordance with another embodiment of the invention. Logic circuit 400 receives a four-bit operand A, consisting of bits $A_3$, $A_2$, $A_1$ and $A_0$, and calculates a four-bit result, consisting of bits $R_3$, $R_2$, $R_1$ and $R_0$. Bits $A_3$ and $R_3$ are the MSBs. Bit $A_3$ is applied to inverter 402, bit $A_2$ is applied to inverter 404, bit $A_1$ is applied to inverter 406, and bit $A_0$ is applied to inverter 408. Inverters 402, 404, 406 and 408 generate bits $\overline{A_3}$, $\overline{A_2}$, $\overline{A_1}$, and $\overline{A_0}$, respectively. Bit $\overline{A_3}$ is applied to a first operand input of half adder 410, bit $\overline{A_2}$ is applied to a first operand input of half adder 412, bit $\overline{A_1}$ is applied to a first operand input of half adder 414, and bit $\overline{A_0}$ is applied to a first operand input of half adder 416. Furthermore, bit $A_3$ is applied to a second operand inputs of half adders 410, 412, 414 and 416, thereby providing a constant C of zero when A is positive, and providing a constant C of negative one when A is negative.

The outputs of half adders 410, 412, 414 and 416 are applied to operand inputs of sum and sum-plus-one adder 418. In particular, sum bit $S_A$ of half adder 410 and carry-out bit $C_B$ of half adder 412 are applied to stage 3 of adder 418, sum bit SB of half adder 412 and carry-out bit $C_C$ of half adder 414 are applied to stage 2 of adder 418, sum bit $S_C$ of half adder 414 and carry-out bit $C_D$ of half adder 416 are applied to stage 1 of adder 418, and sum bit $S_D$ of half adder 416 and a zero are applied to stage 0 of adder 418. Accordingly, adder 418 generates a sum output, consisting of bits $S_3$, $S_2$, $S_1$ and $S_0$, and a sum-plus-one output, consisting of bits $S+1_3$, $S+1_2$, $S+1_1$ and $S+1_0$. Adder 418 also generates first carry-out bit $C_{OUT1}$ from stage 3 of the sum output, and second carry-out bit $C_{OUT2}$ from stage 3 of the sum-plus-one output.

The sum output and sum-plus-one output are applied to first and second operand inputs of 2:1 multiplexer 420, and select signal SEL is applied to a control input of multiplexer 420. Multiplexer 420 selects the first input thereof and outputs the sum output when signal SEL is a one, and multiplexer 420 selects the second input thereof and outputs the sum-plus-one output when signal SEL is a zero. Multiplexer 420 outputs bits $M_3$, $M_2$, $M_1$ and $M_0$. Bit $M_3$ is applied to inverter 422, bit $M_2$ is applied to inverter 424, bit $M_1$ is applied to inverter 426, and bit $M_0$ is applied to inverter 428. Inverters 422, 424, 426 and 428 generate bits $R_3$, $R_2$, $R_1$ and $R_0$, respectively.

OR gate 430 generates signal SEL as a one when bit $A_3$ is a one, indicating A is negative. OR gate 430 also generates signal SEL as a one when bit $A_3$ is a zero and EXCLUSIVE-OR gate 432 generates a one, indicating A is zero, when first carry-out bit $C_{OUT1}$ from $\overline{A}$ and second carry-out bit $C_{OUT2}$ from $\overline{A}+1$ have different logical values. Finally, OR gate 430 generates signal SEL as a zero only when bit $A_3$ is a zero and EXCLUSIVE-OR gate 432 generates a zero, indicating A is greater than zero.

Thus, when A is less than zero, bit $A_3$ is a one, adder 418 generates $\overline{A}-1$ at the sum output, signal SEL is a one, multiplexer 420 selects the sum output, inverters 422 to 428 bit-complement $\overline{A}-1$, and the result is $\overline{\overline{A}-1}$. When A is equal to zero, bit $A_3$ is a zero, adder 418 generates $\overline{A}$ at the sum output, signal SEL is a one, multiplexer 420 selects the sum output, inverters 422 to 428 bit-complement $\overline{A}$, and the result is $\overline{\overline{A}}$. When A is greater than zero, bit $A_3$ is a zero, adder 418 generates $\overline{A}+1$ at the sum-plus-one output, signal SEL is a zero, multiplexer 420 selects the sum-plus-one output, inverters 422 to 428 bit-complement $\overline{A}+1$, and the result is $\overline{\overline{A}+1}$.

Figure 5:
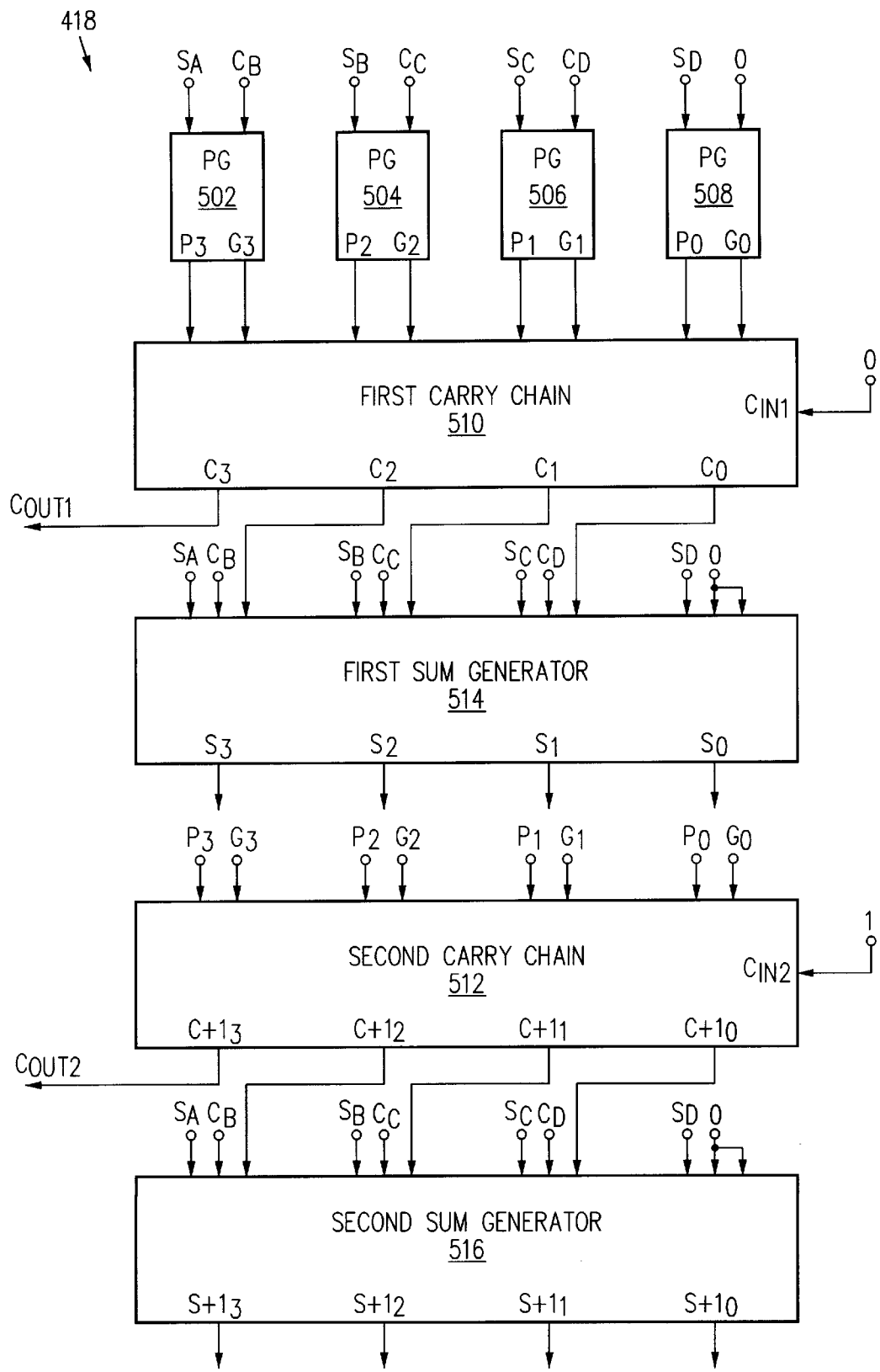
FIG. 5 is a block diagram of a sum and sum-plus-one adder suitable for use in the logic circuit of FIG. 4.

FIG. 5 shows an implementation for adder 418. In this implementation, the sum output is provided by carry look ahead adders that perform fast addition within the basic step time of an instruction cycle. Propagate-generate (PG) sections 502, 504, 506 and 508 receive bits $S_A$ and $C_B$, $S_B$ and $C_C$, $S_C$ and $C_D$, and $S_D$ and a zero, respectively, and provide propagate and generate signals $P_3$ and $G_3$, $P_2$ and $G_2$, $P_1$ and $G_1$, and $P_0$ and $G_0$, respectively. The propagate and generate signals are furnished to respective stages of first carry chain 510 and second carry chain 512. First carry chain 510 receives a zero as its least significant carry-in bit $C_{IN1}$, and generates carry-out bits $C_3$, $C_2$, $C_1$ and $C_0$. Second carry chain 512 receives a one as its least significant carry-inbit $C_{IN2}$, and generates carry-out bits $C+1_3$, $C+1_2$, $C+1_1$ and $C+1_0$ Carry-outbit $C_3$ provides first carry-outbit $C_{OUT1}$, and carry-outbit $C+1_3$ provides second carry-out bit $C_{OUT2}$. Advantageously, first and second carry-out bits $C_{OUT1}$ and $C_{OUT2}$ are generated concurrently. Furthermore, sum generator 514 receives bits $S_A$, $C_B$ and $C_2$ at stage 3, bits $S_B$, $C_C$, and $C_1$ at stage 2, bits $S_C$, $C_D$ and $C_0$ at stage 1, and bit $S_D$ and a pair of zero's at stage 0. As a result, sum generator 514 generates sum bits $S_3$, $S_2$, $S_1$ and $S_0$. Likewise, sum generator 516 receives bits $S_A$, $C_B$ and $C+1_2$ at stage 3, bits $S_B$, $C_C$, and $C+1_1$ at stage 2, bits $S_C$, $C_D$ and $C+1_0$ at stage 1, and bit $S_D$ and a pair of zero's at stage 0. As a result, sum generator 516 generates sum bits $S+1_3$, $S+1_2$, $S+1_1$ and $S+1_0$. Each stage of sum generators 514 and 516 may include, for instance, first and second two-input EXCLUSIVE-OR gates (not shown), with the inputs of the first EXCLUSIVE-OR gate and the second input of the second EXCLUSIVE-OR gate receiving the bits to be summed, the output of the first EXCLUSIVE-OR gate coupled to the first input of the second EXCLUSIVE-OR gate, and the output of the second EXCLUSIVE-OR gate providing the sum bit. Suitable PG sections, carry chains and sum generators are well-known in the art.

Figure 6:
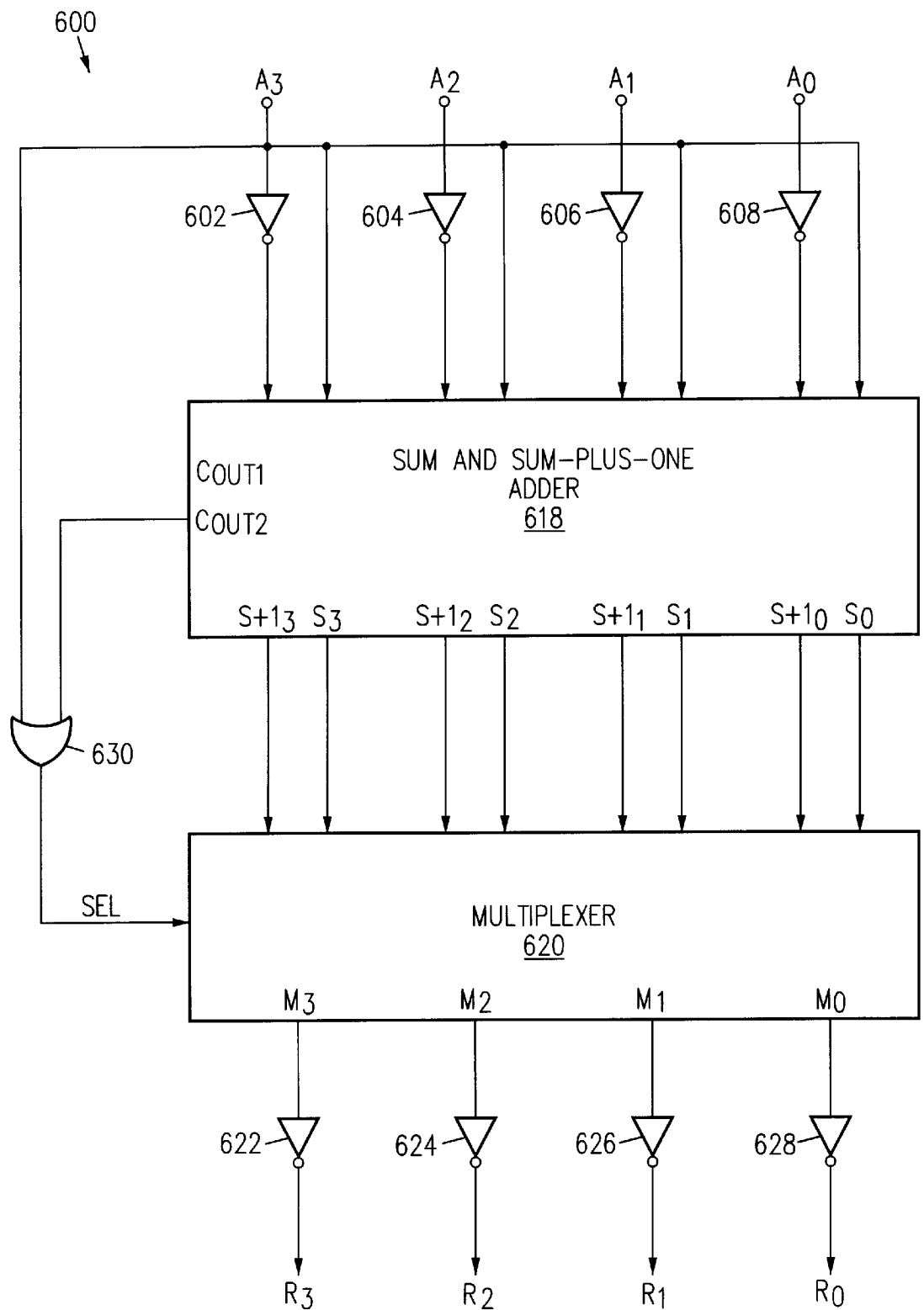
FIG. 6 is a block diagram of a logic circuit for calculating A–sign (A) in accordance with another embodiment of the present invention.

FIG. 6 is a block diagram of a logic circuit 600 for calculating A–sign (A) in accordance with another embodiment of the invention. Logic circuit 600 is a simplified version of logic circuit 400. The circuit elements in logic circuit 600 (inverter 602, adder 618, OR gate 630, etc.) correspond to the circuit elements in logic circuit 400 (inverter 402, adder 418, OR gate 430, etc.), and the related discussion need not be repeated. However, logic circuit 600 has no circuit elements corresponding to half adders 410 to 416 and EXCLUSIVE-OR gate 432. Instead, bits $\overline{A_3}$ and $A_3$ are applied to stage 3 of adder 618, bits $\overline{A_2}$ and $A_3$ are applied to stage 2 of adder 618, bits $\overline{A_1}$ and $A_3$ are applied to stage 1 of adder 618, and bits $\overline{A_0}$ and $A_3$ are applied to stage 0 of adder 618. Thus, A is applied to a first operand input of adder 618, and the constant C, which is zero when A is positive and negative one when A is negative, is applied to the second operand input of adder 618. As a result, adder 618 (like adder 418) generates $\overline{A}-1$ at the sum output when A is less than zero, $\overline{A}$ at the sum output when A is greater than zero, and $\overline{A}+1$ at the sum-plus-one output when A is greater than zero. Furthermore, since first carry-out bit $C_{OUT1}$ is always a zero when A is zero, second carry-out bit $C_{OUT2}$ is coupled directly to OR gate 630.

Although logic circuit 400 has more circuit elements than logic circuit 600, logic circuit 400 can be more easily adapted to accommodate other sign 3 operations.

The description of the invention set forth herein is illustrative, and is not intended to limit the scope of the invention as set forth in the following claims. A general purpose computer or processor can execute the invention in a single instruction cycle (as is preferred) or multiple instruction cycles. The invention is well-suited for many data processing applications. Variations and modifications of the embodiments disclosed herein may be made based on the description set forth herein, without departing from the scope and spirit of the invention as set forth in the following claims.

What is claimed is:

1. An apparatus for calculating A–sign (A), where A is a signed binary integer represented in 2's complement form, sign (A) is equal to one when A is greater than zero, sign (A) is equal to zero when A is zero, and sign (A) is equal to negative one when A is less than zero comprising:

a first inverter circuit for bit-complementing A to obtain $\overline{A}$;

a data selector circuit for setting a constant C to negative one when A is less than zero and for setting the constant C to zero when A is greater than or equal to zero;

an adder circuit for calculating ($\overline{A}$−1) at a sum output when A is less than zero, for calculating ($\overline{A}$+0) at the sum output when A is zero, and for calculating ($\overline{A}$+1) at a sum-plus-one output when A is greater than zero;

a multiplexer for selecting between the sum output and the sum-plus-one output; and a second inverter circuit for bit-complementing an output of the multiplexer, wherein an output of the second inverter circuit provides A−sign (A).

2. The apparatus of claim 1, wherein the adder circuit includes a first operand input coupled to $\overline{A}$, and a second operand input coupled to the constant C.

3. The apparatus of claim 1, including:

a zero detect circuit for determining whether A is zero or nonzero; and a control circuit for controlling the multiplexer in response to a sign bit of A and the zero detect circuit.

4. The apparatus of claim 3, wherein the zero detect circuit determines whether a first carry-out bit from the sum output and a second carry-out bit from the sum-plus-one output have different logical values.

5. An apparatus for calculating A−sign (A), where A is a signed binary integer represented in 2's complement form, sign (A) is equal to one when A is greater than zero, sign (A) is equal to zero when A is zero, and sign (A) is equal to negative one when A is less than zero, comprising:

a first inverter circuit having an operand input coupled to A and having an output for providing a bit-complement of A;

a data selector circuit having an input coupled to a sign bit of A and having an output for setting a constant C to zero when A is greater than or equal to zero and for setting the constant C to negative one when A is less than zero;

an adder circuit having a first operand input coupled to the output of the first inverter circuit, having a second operand input coupled to the output of the data selector circuit, having a sum output representing a sum of the first and second operands, and having a sum-plus-one output representing a sum of the first and second operands plus one;

a zero detect circuit for determining whether A is zero or nonzero;

a multiplexer having a first input coupled to the sum output, having a second input coupled to the sum-plus-one output, having a select input, and having an output;

a control circuit, responsive to a sign bit of A and the zero detect circuit, having a control output coupled to the select input of the multiplexer, which causes the multiplexer to select the first input thereof when A is less than or equal to zero, and causes the multiplexer to select the second input thereof when A is greater than zero; and a second inverter circuit having an operand input coupled to the output of the multiplexer, and having an output that provides A−sign (A).

6. The apparatus of claim 5, wherein:

the control circuit causes the multiplexer to select the first input thereof when the sign bit of A is a one;

the control circuit causes the multiplexer to select the first input thereof when the zero detect circuit indicates A is zero; and the control circuit causes the multiplexer to select the second input thereof when the sign bit of A is a zero and the zero detect circuit indicates A is nonzero.

7. The apparatus of claim 5, wherein data selector circuit couples the sign bit of A to each stage of the adder circuit, thereby setting the constant C to negative one when A is less than zero, and setting the constant C to zero when A is greater than or equal to zero.

8. The apparatus of claim 5, wherein the zero detect circuit determines whether a first carry-out bit from the sum output and a second carry-out bit from the sum-plus-one output have different logical values.

9. The apparatus of claim 8, wherein the first and second carry-out bits are generated concurrently.

10. The apparatus of claim 5, wherein the adder circuit includes a row of carry save adders that provide the first and second operand inputs, a sum adder coupled to the carry save adders for providing the sum output, and a sum-plus-one adder coupled to the carry save adders for providing the sum-plus-one output.

11. The apparatus of claim 10, wherein:

the sum adder includes propagate-generate sections coupled to a first carry chain coupled to a first sum generator that provides the sum output, with the first carry chain having a carry-in bit set to zero; and the sum-plus-one adder includes the propagate-generate sections coupled to a second carry chain coupled to a second sum generator that provides the sum-plus-one output, with the second carry chain having a carry-in bit set to one.

* * * * *